United States Patent [19]

Schüler et al.

[11] 4,390,654

[45] Jun. 28, 1983

[54] VINYL CHLORIDE POLYMER FLAMEPROOFED AND SMOKE INHIBITED WITH A COPPER PHOSPHATE

[75] Inventors: Ralf Schüler, Recklinghausen; Günther Maahs, Marl, both of Fed. Rep. of Germany

[73] Assignee: Chemische Werke Huels, A.G., Marl, Fed. Rep. of Germany

[21] Appl. No.: 372,762

[22] Filed: Apr. 28, 1982

[30] Foreign Application Priority Data

Apr. 29, 1981 [DE] Fed. Rep. of Germany ....... 3116969

[51] Int. Cl.$^3$ ............................................... C08K 3/32
[52] U.S. Cl. ................................................... 524/413
[58] Field of Search ........................ 524/413; 523/121; 423/604; 428/921; 106/18.31, 18.14

[56] References Cited

U.S. PATENT DOCUMENTS

| | | | |
|---|---|---|---|
| 3,740,264 | 6/1973 | Lynch et al. | 106/18.14 |
| 3,821,151 | 6/1974 | Mitchell | 524/413 |
| 3,845,001 | 10/1974 | Mitchell | 524/413 |
| 4,053,451 | 10/1977 | Kroenke | 524/413 |
| 4,053,453 | 10/1977 | McRowe et al. | 524/413 |
| 4,157,329 | 6/1979 | Sandler et al. | 524/413 |

FOREIGN PATENT DOCUMENTS

| | | | |
|---|---|---|---|
| 448533 | 5/1948 | Canada | 106/18.14 |
| 48-19204 | 12/1973 | Japan | 428/921 |

*Primary Examiner*—V. P. Hoke
*Attorney, Agent, or Firm*—Millen & White

[57] ABSTRACT

A polyvinyl chloride blend contains, as a smoke-reducing additive, a copper (II) hydroxide phosphate of the composition $Cu_3(PO_4)_2 \cdot Cu(OH)_2$ in amounts from about 0.1 to 20 parts by weight per 100 parts by weight of polyvinyl chloride. The thus-treated polyvinyl chloride is not discolored by the addition of this copper compound a significant advantage when compared to conventional copper compound additives.

12 Claims, No Drawings

VINYL CHLORIDE POLYMER FLAMEPROOFED AND SMOKE INHIBITED WITH A COPPER PHOSPHATE

BACKGROUND OF THE INVENTION

Vinyl chloride polymers, with hard as well as soft characteristics, are being increasingly utilized as building components in buildings and conduits, as well as in fabrics, upholsteries, and wall coverings. Because of these uses, there is a need that these materials be subjected to treatments to improve their fire-retarding characteristics as well as for reducing the amount of smoke evolved in the event of a fire. A large number of additives have been suggested, which are incorporated into polyvinyl chloride for this purpose. However, very few of the materials suggested have proven to be satisfactory. Many of the additive compounds are incompatible with polyvinyl chloride, i.e., are hard to incorporate, and result in intense discolorations of the polyvinyl chloride, or adversely affect the physical properties of the polyvinyl chloride.

Often the smoke-reducing properties of the additive are only apparent properties because the additive actually functions only as a flame retardant which in turn reduces the amount of smoke evolved. More specifically, when this type of additive is tested, in polyvinyl chloride usually under the testing conditions of an NBS smoke chamber, one of the most widely used standard methods for determining smoke density, the amount of smoke evolved under flaming conditions is lower than that evolved under smoldering conditions. Actual smoke reduction under smoldering conditions is observed only rarely; however, one should expect this property from a true smoke-reducing additive.

The prior art teaches that various copper compounds, alone or in mixtures with other metallic compounds, are effective smoke-reducing additives. U.S. Pat. No. 3,845,001 teaches the use of $Cu_2O$ alone, or in mixtures with $MoO_3$ or Fe powder. According to U.S. Pat. No. 3,903,028, $Cu_2O$ is employed in combination with $Fe_2O_3$. However, all of these compounds result in a considerable discoloration of the polymers. The prior art also teaches the use of copper salts in the form of carboxylates or, for example, acetylacetonate, but these substances are also unsuitable due to the decomposition of the compounds at the incorporation temperatures, and because of the discoloration connected therewith. DOS No. [German Unexamined Laid-Open Application] 2,700,656 suggests the use of copper oxalate as the smoke-reducing additive. The copper oxalate is incorporated in this case at a temperature of 163° C., and the polymer is press-molded into panels at 177° C. However, at the usually higher incorporation temperatures of about 190°–200° C., the use of copper oxalate also results in significant discoloration toward a blue-gray color.

OBJECTS OF THE INVENTION

It is thus an object of the invention to provide an additive to vinyl chloride polymers which provides smoke reducing characteristics to the polymers.

It is also an object of the invention to provide an additive to vinyl chloride polymers which provides fire retarding characteristics to the polymers.

A further object of the invention is to provide a polyvinyl chloride blend having improved flame retarding, as well as improved smoke reducing characteristics.

Still another object of the invention is to provide a method of use of a copper (II) hydroxide phosphate to render vinyl chloride polymers flame retarding, and to reduce the amount of smoke evolved during burning of said polymers.

Upon further study of the specification and appended claims, further objects and advantages of this invention will become apparent to those skilled in the art.

SUMMARY OF THE INVENTION

In accordance with the invention, there are provided polyvinyl chloride blends containing a copper compound. More specifically, the polyvinyl chloride contains as the copper compound a copper (II) hydroxide phosphate. The copper (II) hydroxide phosphate is of the composition $Cu_3(PO_4)_2 \cdot Cu(OH)_2$ and does not cause discoloration of the polyvinyl chlorides when incorporated therein. It also does not decompose at relatively high incorporation temperatures. The amount of copper (II) hydroxide phosphate additive can vary in amounts of from about 0.1 to 20 parts by weight per 100 parts by weight of polyvinyl chloride. Even with concentrations of up to 20% by weight of the respective copper (II) hydroxide phosphate in a polyvinyl chloride blend having the normal additives, there is no discoloration produced. Furthermore, the copper (II) hydroxide phosphate additive provides significant smoke reduction under smoldering as well as under flaming conditions, as measured in the NBS smoke chamber, along with a reduction in the flammability of the material.

DETAILED DISCUSSION OF THE INVENTION

The copper (II) hydroxide phosphate is normally incorporated in powder form in amounts of from 0.1 to 20 parts by weight, preferably 1–10 parts by weight, and more preferably 5 parts by weight, per 100 parts by weight of polyvinyl chloride.

The copper (II) hydroxide phosphate can be produced by the dropwise addition of stoichiometric quantities of orthophosphoric acid to an aqueous slurry of copper (II) hydroxide carbonate of the formula $2 CuCO_3 \cdot Cu(OH)_2$ at 100° C. After a relatively long time of agitation, e.g., 1 to 2 hours, under boiling conditions, e.g., under reflux, the precipitated product is vacuum-filtered, washed, and dried at 100° C. under reduced pressure, typically 0.01 bar to atmospheric pressure. The copper (II) hydroxide phosphate produced according to this method has the composition $Cu_3(PO_4)_2 \cdot Cu(OH)_2$. This compound is a light grey-green, fine powder thermally stable up to temperatures above 500° C. Other methods of preparing this compound are described in "Gmelins Handbuch der anorganischen Chemie" [Gmelin's Handbook of Inorganic Chemistry"] vol. 60, part B, Pages 920–925, whose disclosure is incorporated by reference herein. The effect of smoke reducing is increased with decreasing middle of the grain diameter of copper (II) hydroxide phosphate. Therefore it is recommended the average particle diameter of copper (II) hydroxide phosphate being 0.1 up to 100.0 μm, preferred 0.1 up to 50.0 μm.

The vinyl chloride polymers in which this additive can be employed include the vinyl chloride homopolymers, i.e., polyvinyl chloride, as well as the various copolymers containing vinyl chloride and up to about 50% of at least one other vinylidene monomer containing at least one end-position group of the formula $CH_2=C$, such as ethylene, propylene, the higher olefins, vinyl esters, allyl esters, acrylic acid esters, methacrylic acid esters, olefinedicarboxylic acids, acrylonitrile, etc. Additional vinyl chloride polymers include the chlorinated vinyl chloride polymers and mixtures thereof with other synthetic-resin-type polymers and elastomeric polymers.

The method of manufacturing the polyvinyl chloride is not significant, and any conventional method can be followed. Thus, one polyvinyl chloride which can be utilized is suspension polyvinyl chloride produced, e.g., according to the methods described in the treatise, of Kainer, "Polyvinylchlorid and Vinylchlorid-Mischpolymerisate" [Polyvinyl Chloride and Vinyl Chloride Copolymers], Springer publishers, Berlin-Heidelberg-New York (1965), Pages 12-34, whose disclosure is incorporated by reference herein. Emulsion polyvinyl chloride can also be utilized which has been produced by e.g., the methods disclosed in pages 34–59 of the same treatise, or block polyvinyl chloride manufactured according to the methods discussed on pages 7-10 of the Kainer treatise, all of which disclosures are incorporated by reference herein.

The vinyl chloride polymers can be used together with conventional mixture additives well known to those skilled in the art such as, e.g., plasticizers, lubricants, stabilizers, fillers, coloring agents, auxiliary processing agents, as well as other flame retardants and the like. Such additives are described, for example, in the aforementioned treatise by Kainer, on pages 193-329 thereof, whose disclosure is incorporated by reference herein.

The vinyl chloride polymers with and without the copper (II) hydroxide phosphate were tested and the following examples indicate the maximum smoke density $D_m/g$, determined in the NBS chamber, based on the proportional weight of the copper (II) hydroxide phosphate in the test specimen, and the percentage smoke reduction when compared with a zero specimen. The NBS testing method is described in ASTM E-662. Typically test panels having dimensions of $75 \times 75$ mm$^2$, and about 1 mm in thickness, are vertically disintegrated in a specimen holer by means of a radiant heater which generates a heat intensity of 2.5 W/cm$^2$ on the surface of the specimen, and the amount of evolving smoke is determined by means of an optical measuring system which also is conventional in nature. In addition to the smoke densities obtained under smoldering conditions, smoke densities under flaming conditions can also be obtained by directing ignition flames onto the specimen.

In the examples, to indicate the characteristic value for flammability, the LOI value (Limited Oxygen Index) according to ASTM-D 2863-77 is indicated. The LOI value is the conventional value used indicating the oxygen concentration at which a test rod having a thickness of $3 \times 6$ mm$^2$ and a length of 150 mm continues spontaneous burning after an initial ignition for a period of at least 3 minutes. After the three minute time limit is reached, no more than an additional 5 cm of the rod is allowed to burn.

In example 1, 2 and 4, a copper (II) hydroxide phosphate with an average particle diameter of ca. 15 μm has been used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A vinyl chloride polymer mixture was prepared as follows:

100 parts by weight of granulated PVC of a standard type having the following composition:
80 parts M-PVC (bulk-PVC)
20 parts E-PVC (emulsion-PVC)
2.5 parts lead phosphite
1.5 parts lead stearate
0.5 parts calcium stearate
1.8 parts stearic acid and stearic acid derivatives
12 parts chalk
6 parts pigment (TiO$_2$+carbon black), was intimately kneaded on a roll at a temperature of 180° C. with various differing amounts of copper (II) hydroxide phosphate of the formula $Cu_3(PO_4)_2 \cdot Cu(OH)_2$, and thereafter press-molded into panels having a thickness of 1 mm. These panels were cut to a size of $75 \times 75$ mm$^2$ and disintegrated in the NBS smoke chamber under standard conditions, with and without an ignition flame. The smoke evolved, measured by means of the reduction in the intensity of a light beam passing therethrough, and the signals from a light sensor recorded by means of a recorder and the maximum smoke density was determined therefrom. The following Table I lists the results of these measurements as well as the results of the determination of the LOI value for indicating flammability. In the table all values are percent by weight values.

EXAMPLE 2

In order to demonstrate the advantages provided by using copper (II) hydroxide phosphate in polyvinyl chloride mixtures with respect to discolorations of the material, polymer blends were produced having the following composition: 100 parts by weight of the same polyvinyl chloride as in Example 1, and 2.5 parts by weight of copper (II) hydroxide phosphate or comparable copper oxalate, respectively. The additives were incorporated into the polyvinyl chloride at a temperature of 160° C., and this mixture was pressed into panels at temperatures of from 160° to 210° C., respectively rising at 10° intervals. In the case of the panel having copper (II) hydroxide phosphate, no discolorations were observed. In contrast thereto, the panel having copper oxalate showed a discoloration which became greatly intensified with increasing temperature. More specifically, panels pressed at a temperature of 210° C. showed a deep blue-grey color, i.e., a high degree of discoloration.

TABLE I

| Parts of Copper (II) Hydroxide Phosphate | | Smoke Density | | | |
|---|---|---|---|---|---|
| | | Smoldering | | Flaming | |
| | LOI | $D_m/g$ (g$^{-1}$) | Smoke Reduction | $D_m/g$ (g$^{-1}$) | Smoke Reduction |
| 0 | 44 | 21 | — | 37 | — |
| 0.5 | 43 | 20 | 5% | 27 | 27% |
| 1 | 44 | 19 | 10% | 25 | 32% |
| 2.5 | 48 | 17 | 19% | 21 | 43% |

TABLE I-continued

| Parts of Copper (II) Hydroxide Phosphate | LOI | Smoke Density | | | |
|---|---|---|---|---|---|
| | | Smoldering | | Flaming | |
| | | $D_m/g$ (g$^{-1}$) | Smoke Reduction | $D_m/g$ (g$^{-1}$) | Smoke Reduction |
| 5 | 54 | 14 | 33% | 16 | 57% |
| 10 | 60 | 9 | 57% | 13 | 65% |

EXAMPLE 3

For comparison purposes, vinyl chloride polymer blends having the following compositions were produced: 100 parts by weight of the same polyvinyl chloride as in Example 1, and respectively 1–10 parts by weight of copper oxalate. The mixture was incorporated into the polyvinyl chloride at 160° C. in accordance to the method taught in DOS No. 2,700,656, and at a temperature of 170° C. pressed into panels having a thickness of 1 mm. The smoke density of these specimen panels was determined under smoldering as well as flaming conditions, and these values were compared with the values from Example 1. The results are compiled in the following Table II.

EXAMPLE 4

In accordance with Example 1, a plasticized polyvinyl chloride having approximately the following composition:
70 parts S-PVC (suspension-PVC)
30 parts DOP plasticizer (dioctylphthalate)
2 parts lead stearate
10 parts chlorinated paraffin
13 parts chalk,
and various proportions of copper (II) hydroxide phosphate were used to manufacture test panels, and the smoke evolved as well as the LOI value were determined. The results are listed in the following Table III.

TABLE II

| | Smoldering | | | | Flaming | | | |
|---|---|---|---|---|---|---|---|---|
| | Copper Oxalate | | Copper(II) Hydroxide Phosphate | | Copper Oxalate | | Copper(II) Hydroxide Phosphate | |
| Concentration | $D_m/g$ | Reduction | $D_m/g$ | Reduction | $D_m/g$ | Reduction | $D_m/g$ | Reduction |
| 1.0 | 20 | 5% | 19 | 10% | 29 | 22% | 25 | 32% |
| 2.5 | 18 | 15% | 17 | 20% | 26 | 30% | 21 | 43% |
| 5.0 | 15 | 30% | 14 | 35% | 24 | 35% | 16 | 57% |
| 10.0 | 15 | 30% | 9 | 57% | 23 | 38% | 13 | 65% |
| 0 Comparative Sample | | | 21 | | | | 37 | |

TABLE III

| Parts of Copper(II) Hydroxide Phosphate per 100 Parts PVC | LOI | Smoke Density | | | |
|---|---|---|---|---|---|
| | | Smoldering | | Flaming | |
| | | $D_m/g$ (g$^{-1}$) | Smoke Reduction | $D_m/g$ (g$^{-1}$) | Smoke Reduction |
| 0 | 24 | 64 | — | 58 | — |
| 1 | 23 | 58 | 9% | 53 | 9% |
| 2.5 | 24 | 59 | 8% | 51 | 12% |
| 5 | 25 | 56 | 13% | 43 | 26% |
| 10 | 26 | 50 | 22% | 35 | 40% |

The preceding Examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A polyvinyl chloride blend comprising a vinyl chloride polymer and an amount of copper (II) hydroxide phosphate of the formula $Cu_3(PO_4)_2.Cu(OH)_2$ effective as a smoke retardant.

2. A polymer blend according to claim 1, wherein the amount of copper (II) hydroxide phosphate is about 0.1–20 parts by weight per 100 parts by weight of polyvinyl chloride.

3. A polymer blend according to claim 2, wherein the amount of copper (II) hydroxide phosphate is about 1–10 parts by weight per 100 parts by weight of polyvinyl chloride.

4. A polymer blend according to claim 3, wherein the amount of copper (II) hydroxide phosphate is about 10 parts by weight per 100 parts by weight of polyvinyl chloride.

5. A polymer blend according to claim 1, wherein said vinyl chloride polymer is a homopolymer.

6. A polymer blend according to claim 1, wherein said polyvinyl chloride is a copolymer with up to 50% of another vinylidene monomer.

7. A polymer blend according to claim 1, further comprising synthetic-resin-type polymers or elastomeric polymers.

8. A polymer blend according to claim 1, further comprising at least one of plasticizers, lubricants, stabilizers, fillers, coloring agents, auxiliary processing agents and flame retardants.

9. A polymer blend according to claim 1, wherein the average particle diameter of copper (II) hydroxide phosphate is 0.1 up to 100.0 μm.

10. A polymer blend according to claim 1, wherein the average particle diameter of copper (II) hydroxide phosphate is 0.1 up to 50.0 μm.

11. A method of rendering a vinyl chloride polymer smoke retardant comprising incorporating into the polyvinyl chloride an amount of $Cu_3(PO_4)_2.Cu(OH)_2$ effective as a smoke retardant.

12. A method as in claim 11, comprising incorporating $Cu_3(PO_4)_2.Cu(OH)_2$ in amounts of 0.1–20% by weight based on the weight amount of polyvinyl chloride.

* * * * *